US009600852B2

(12) United States Patent
Demouth

(10) Patent No.: US 9,600,852 B2
(45) Date of Patent: Mar. 21, 2017

(54) HIERARCHICAL HASH TABLES FOR SIMT PROCESSING AND A METHOD OF ESTABLISHING HIERARCHICAL HASH TABLES

(71) Applicant: Nvidia Corporation, Santa Clara, CA (US)

(72) Inventor: Julien Demouth, Courbevoie (FR)

(73) Assignee: Nvidia Corporation, Santa Clara, CA (US)

( * ) Notice: Subject to any disclaimer, the term of this patent is extended or adjusted under 35 U.S.C. 154(b) by 332 days.

(21) Appl. No.: 13/891,614

(22) Filed: May 10, 2013

(65) Prior Publication Data

US 2014/0333635 A1    Nov. 13, 2014

(51) Int. Cl.
*G06F 17/30* (2006.01)
*G06F 9/38* (2006.01)
*G06T 1/20* (2006.01)
*G06F 9/30* (2006.01)

(52) U.S. Cl.
CPC ............ *G06T 1/20* (2013.01); *G06F 9/30098* (2013.01); *G06F 9/3836* (2013.01); *G06F 9/3885* (2013.01); *G06F 17/3033* (2013.01)

(58) Field of Classification Search
None
See application file for complete search history.

(56) References Cited

U.S. PATENT DOCUMENTS

| | | | |
|---|---|---|---|
| 7,584,342 B1 * | 9/2009 | Nordquist et al. | 712/22 |
| 8,169,440 B2 * | 5/2012 | Stuttard et al. | 345/505 |
| 2002/0073282 A1 * | 6/2002 | Chauvel et al. | 711/122 |
| 2004/0044727 A1 * | 3/2004 | Abdelaziz et al. | 709/203 |
| 2008/0184211 A1 * | 7/2008 | Nickolls et al. | 717/140 |
| 2012/0005424 A1 * | 1/2012 | Shi | G06F 11/1076 711/114 |
| 2012/0011108 A1 * | 1/2012 | Bensberg et al. | 707/714 |
| 2013/0238656 A1 * | 9/2013 | Chen | G06F 17/30575 707/770 |

OTHER PUBLICATIONS

"Register"; Apr. 11, 2001; Webopedia; www.webopedia.com/TERM/R/register.html.*

* cited by examiner

*Primary Examiner* — Joni Richer

(57) ABSTRACT

A graphical processing unit having an implementation of a hierarchical hash table thereon, a method of establishing a hierarchical hash table in a graphics processing unit and GPU computing system are disclosed herein. In one embodiment, the graphics processing unit includes: (1) a plurality of parallel processors, wherein each of the plurality of parallel processors includes parallel processing cores, a shared memory coupled to each of the parallel processing cores, and registers, wherein each one of the registers is uniquely associated with one of the parallel processing cores and (2) a controller configured to employ at least one of the registers to establish a hierarchical hash table for a key-value pair of a thread processing on one of the parallel processing cores.

20 Claims, 3 Drawing Sheets

HIERARCHICAL HASH TABLES FOR SIMT PROCESSING AND A METHOD OF ESTABLISHING HIERARCHICAL HASH TABLES

TECHNICAL FIELD

This application is directed, in general, to hash tables and, more specifically, to hash tables for single instruction multiple threads (SIMT).

BACKGROUND

A graphics processing unit computing system includes a combination of a Graphics Processing Unit (GPU) and a Central Processing Unit (CPU). As such, efficiently operating a graphics pipeline includes distributing a workload appropriately between the CPU and the GPU according to the differences between the two architectures.

One difference between a GPU and a CPU is in how the two architectures address the issue of accessing off-chip memory. This can be an expensive operation and include hundreds of clock cycles of latency. In CPUs, many transistors are allocated to on-chip caches in order to reduce the overall latency caused by off-chip memory accesses.

In contrast, GPUs devote more transistors to arithmetic units than to memory cache, thereby achieving much higher arithmetic throughput than CPUs. However, this GPU architecture results in higher latency for off-chip memory access compared to CPUs.

SUMMARY

In one aspect, the present disclosure provides a graphical processing unit having an implementation of a hierarchical hash table thereon. In one embodiment, the graphics processing unit includes: (1) a plurality of parallel processors, wherein each of the plurality of parallel processors includes parallel processing cores, a shared memory coupled to each of the parallel processing cores, and registers, wherein each one of the registers is uniquely associated with one of the parallel processing cores and (2) a controller configured to employ at least one of the registers to establish a hierarchical hash table for a key-value pair of a thread processing on one of the parallel processing cores.

In another aspect, the present disclosure provides a method of establishing a hierarchical hash table in a graphics processing unit having parallel processors. In one embodiment, the method includes: (1) receiving a key and a value of a key-value pair of a thread processing on a parallel processor; and selecting a register of a parallel processing core of the parallel processor to insert the value.

In yet another aspect, the disclosure provides a GPU computing system, including: (1) a central processing unit including a processor and associated with a memory and (2) a graphics processing unit having a hierarchical hash table, the graphics processing unit including: (2A) a plurality of parallel processors, wherein each of the plurality of parallel processors includes parallel processing cores, a shared memory coupled to each of the parallel processing cores, and registers, wherein each one of the registers is uniquely associated with one of the parallel processing cores and (2B) a controller configured to employ the registers to store values of key-value pairs associated with threads executing on the parallel processing cores.

BRIEF DESCRIPTION

Reference is now made to the following descriptions taken in conjunction with the accompanying drawings, in which.

DETAILED DESCRIPTION

A GPU includes a plurality of multiprocessors, referred to herein as parallel processors. To increase arithmetic density, each GPU parallel processor has a single instruction unit for multiple arithmetic units. The threads running on a parallel processor are partitioned into groups in which all threads execute the same instruction simultaneously. This execution model is referred to as Single Instruction Multiple Threads (SIMT). For example, the CUDA architecture from Nvidia Corporation of Santa Clara, Calif., has groups that are called warps, wherein each warp has 32 threads.

Each thread needs to maintain a small hash table, with implicitly synchronized threads independently inserting and querying entries. A difficulty, however, is that with a large number of threads, the amount of near (on-chip) memory is severely limited, resulting in difficulty achieving high performance on hierarchical memory architectures like on GPUs.

This disclosure provides a scheme to implement parallel hash tables shared by implicitly synchronized threads. The parallel hash tables, referred to herein as hierarchical hash tables, employ registers and shared memory of parallel processors to store key-value pairs. Hardware instructions can be used to insert values in registers of different threads and to indicate when the registers are full. Being able to employ register files for hash tables advantageously reduces latency associated with memory accesses since the registers are the fastest memory pool, i.e., closest memory pool with a lower latency compared to a shared memory and a global memory associated with a parallel processor. Additionally, employing the registers takes advantage of the largest on-chip memory pool of a parallel processor, the registers.

In one embodiment, the hierarchical hash tables are generated based on an algorithm that employs hierarchical memory to store keys and values of a hash table. The keys and values are designed to be stored in the three levels of memory associated with a parallel processor: registers or another type of non-dynamically addressable memory, shared memory and global memory. In embodiments disclosed herein, a protocol is implemented to emulate dynamic addressing of the registers. Though employing the registers has the disadvantage of requiring more steps for insertion of values, it offers the advantage of processing larger hash tables on chip, i.e., on the parallel processor.

In embodiments disclosed herein, the hierarchical hash tables use shared memory to store keys, registers to store values and global GPU memory to store remaining keys and values. A remaining key or value is a key or value that cannot be stored in a register or a shared memory.

Before describing various embodiments of the novel method and mechanism, a GPU computing system within which the mechanism may be embodied or the method carried out will be described.

Figure 1:
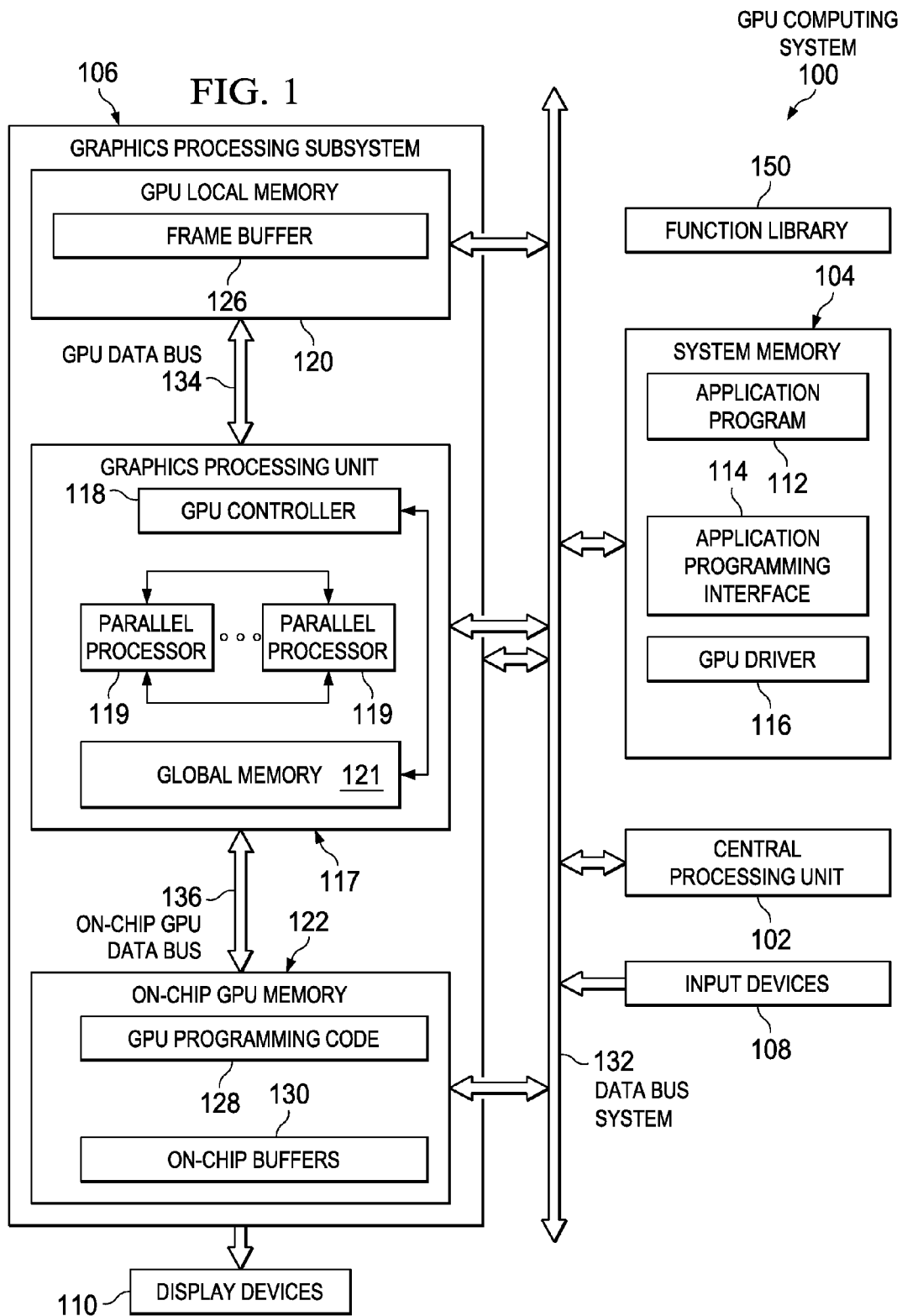
FIG. 1 is a block diagram of one embodiment of a computing system in which one or more aspects of the disclosure may be implemented according to the principles thereof.

FIG. 1 is a block diagram of one embodiment of a GPU computing system 100 in which one or more aspects of the invention may be implemented. The GPU computing system 100 includes a system data bus 132, a central CPU 102, input devices 108, a system memory 104, a graphics processing subsystem 106 including a graphics processing unit (GPU) 117, display devices 110 and a function library 150. In alternate embodiments, the CPU 102, portions of the graphics processing subsystem 106, the system data bus 132, or any combination thereof, may be integrated into a single processing unit. Further, the functionality of the graphics processing subsystem 106 may be included in a chipset or in some other type of special purpose processing unit or co-processor.

As shown, the system data bus 132 connects the CPU 102, the input devices 108, the system memory 104, and the graphics processing subsystem 106. In alternate embodiments, the system memory 100 may connect directly to the CPU 102. The CPU 102 receives user input from the input devices 108, executes programming instructions stored in the system memory 104, operates on data stored in the system memory 104, sends instructions and/or data (i.e., work or tasks to complete) to a graphics processing unit 117 to complete and configures needed portions of the graphics processing system 106 for the GPU 117 to complete the work. The system memory 104 typically includes dynamic random access memory (DRAM) used to store programming instructions and data for processing by the CPU 102 and the graphics processing subsystem 106. The GPU 117 receives the transmitted work from the CPU 102 and processes the work. In one embodiment, the GPU 117 completes the work in order to render and display graphics images on the display devices 110. In other embodiments, the graphics processing subsystem 106 can be used for non-graphics processing. For example, the GPU 117 can be used to implement the logic of the function library 150 to address various problems. Parallel processors 119 to 119n of the GPU 117 are employed for processing the work. As used herein, "n" is an integer value. With respect to the GPU 117, n indicates the number of parallel processors. As used throughout the disclosure, n can vary depending on the particular type of GPU.

As also shown, the system memory 104 includes an application program 112, an application programming interface (API) 114, and a graphics processing unit (GPU) driver 116. The application program 112 generates calls to the API 114 in order to produce a desired set of results, such as a sequence of graphics images.

The graphics processing subsystem 106 includes the GPU 117, an on-chip GPU memory 122, an on-chip GPU data bus 136, a GPU local memory 120, and a GPU data bus 134. The GPU 117 is configured to communicate with the on-chip GPU memory 122 via the on-chip GPU data bus 136 and with the GPU local memory 120 via the GPU data bus 134. As noted above, the GPU 117 can receive instructions from the CPU 102, process the instructions in order to render graphics data and images (or perform non-graphics operations), and store these images or resulting data in the GPU local memory 120. Subsequently, the GPU 117 may display certain graphic images or data stored in the GPU local memory 120 on the display devices 110.

The GPU 117 includes a GPU controller 118, the parallel processors 119 to 119n, and a global memory 121. The controller 118 is configured to assist in operating the GPU 117. The controller 118 includes the necessary logic, via hardware software or a combination thereof, to direct operations of the parallel processors 119 to 119n. Each of the parallel processors 119 to 119n also includes its own control units, registers, execution pipelines and caches. In some embodiments, the parallel processors 119 to 119n are configured as a graphics pipeline or as a portion of a graphics pipeline.

Each of parallel processors 119 to 119n are coupled to the global memory 121. The GPU 117 may be provided with any amount of on-chip GPU memory 122 and GPU local memory 120, including none, and may use on-chip GPU memory 122, GPU local memory 120, and system memory 104 in any combination for memory operations. The CPU 102 can allocate portions of these memories for the GPU 117 to execute work.

Figure 2:
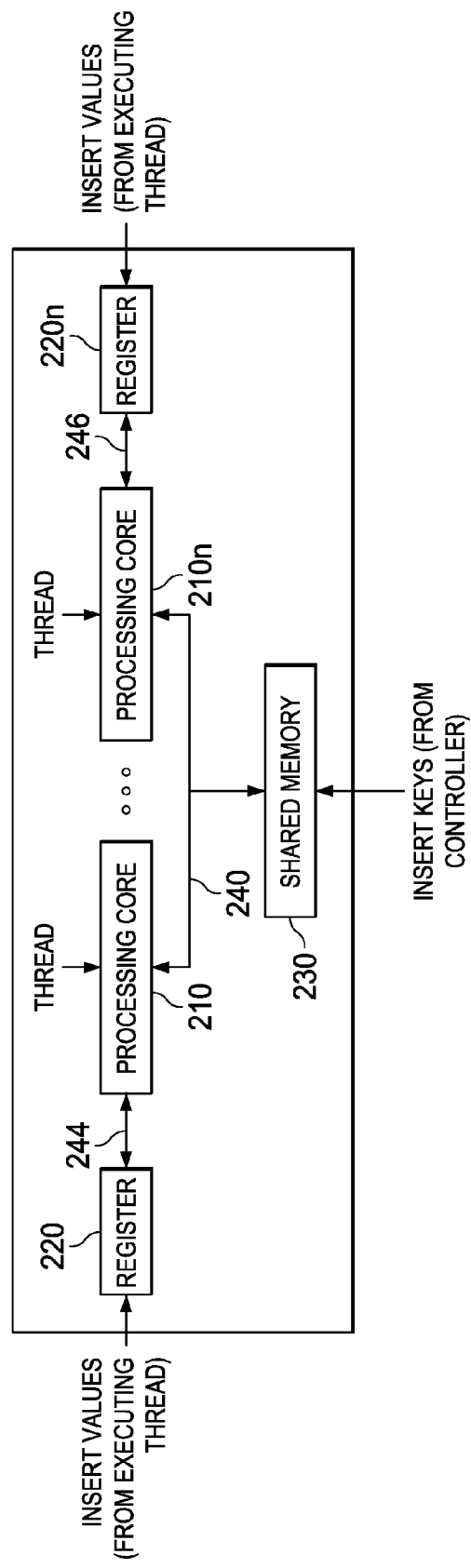
FIG. 2 illustrates a block diagram of an embodiment of a parallel processor of a GPU in which a hierarchical hash table can be established according to the principles of the disclosure.

Additionally, each one of the parallel processors 119 to 119n include a shared memory and registers that are not shown in FIG. 1. The shared memory, the registers and the global memory 121 provide a hierarchical memory structure for each of the processing cores 119 to 119n. Accessing the registers and the shared memory reduces latency compared to accessing the other above noted memories of the graphics processing system 106. FIG. 2 provides more detail of a single parallel processor having a shared memory and registers wherein the hierarchical hash tables disclosed herein can be advantageously implemented.

The GPU 117 is used to implement a hierarchical hash table employing the hierarchical memory structure associated with parallel processors 119 to 119n. The GPU 117 is configured to employ the registers of the parallel processors 119 to 119n to store values of key-value pairs associated with threads executing on parallel processing cores of the parallel processors 119 to 119n. Additionally, the GPU 117 is configured to employ the shared memory to store keys of the key-value pairs. As such, the GPU 117 employs the registers and shared memory of the parallel processors 119 to 119n to establish a hierarchical hash table that associates keys to values for executing threads. The GPU 117 is also configured to employ the global memory 121 for the hierarchical hash table when the registers and the shared memory are full. By employing the registers and shared memory for a hash table, memory accesses to the global memory 121 are minimized and latency is reduced.

The on-chip GPU memory 122 is configured to include GPU programming code 128 and on-chip buffers 130. The GPU programming 128 may be transmitted from the GPU driver 116 to the on-chip GPU memory 122 via the system data bus 132.

The GPU local memory 120 typically includes less expensive off-chip dynamic random access memory (DRAM) and is also used to store data and programming used by the GPU 117. As shown, the GPU local memory 120 includes a frame buffer 126. The global memory 121 can be a programming abstraction. In one embodiment, the global memory 121 can be physically located on the on-chip memory 122. In other embodiments, the global memory 121 is physically located on the local memory 120. In yet other embodiments, the global memory 121 can be physically located on both the on-chip memory 122 and the local memory 120.

The display devices 110 are one or more output devices capable of emitting a visual image corresponding to an input data signal. For example, a display device may be built using a cathode ray tube (CRT) monitor, a liquid crystal display, or any other suitable display system. The input data signals to the display devices 110 are typically generated by scanning out the contents of one or more frames of image data that is stored in the frame buffer 126.

The functions library 150 is a database that stores a series of operating instructions that represent an algorithm for performing a particular function. In one embodiment, the functions library 150 can be an Algebraic Multigrid (AMG) Solver. As such, the hierarchical hash tables disclosed herein can be used within the AMG solver for Sparse Matrix-Matrix Product (SpMM) or, more specifically, to compute the product of sparse matrices in Compressed Sparse Row (CSR) format.

While SpMM multiplication is an important component of AMG methods, other important operations can be reduced to an operation similar in structure to SpMM, where the most efficient implementation uses a per-warp on-chip hash-table to compute segmented reductions (without sorting). Examples of "SpMM-like" operations that benefit from the disclosed hierarchical hash table include computing the 2-ring of each vertex in a graph, computing the sparsity pattern for ILU1 factorization and computing the graph structure resulting from vertex aggregation. Additionally, a 2-ring interpolation method which uses the same framework as the SpMM multiplication can employ the hierarchical hash table. The ILU1 can be used as part of solvers. The hierarchical hash tables, therefore, can be used to accelerate a range of operations that are important for a variety of graph and sparse linear algebra applications.

Having described a GPU computing system including a GPU with parallel processors in which hierarchical hash tables and method for generating hierarchical hash tables may be embodied or carried out, embodiments of a parallel processor and a method will be described.

FIG. 2 illustrates a block diagram of an embodiment of a parallel processor 200 upon which at least a portion of a hierarchical hash table is established according to the principles of the disclosure. The parallel processor 200 can be one of the parallel processors 119 to 119*n* illustrated in FIG. 1. FIG. 2 illustrates implementation of a hierarchical hash table using innovative tricks to be able to achieve good performance in an extremely constraint memory context. For example, in embodiments disclosed herein a protocol is implemented to emulate dynamic addressing of registers.

The parallel processor 200 includes processing cores 210 to 210*n*, register 220 to 220*n*, a shared memory 230 and connecting circuitry 240. Additionally, one skilled in the art will understand that the parallel processor 200 can include additional components that are not illustrated but are typically included in a parallel processor, such as thread schedulers, and special-function units.

The processing cores 210-210*n* are configured to perform parallel processing of a single instruction, i.e., SIMT processing. Each one of the registers 220 to 220*n* is specifically associated with a particular one of the processing cores 210 to 210*n*. As such, each of the registers 220 to 220*n* provide a quick access for threads executing on the processing cores 210 to 210*n*. In the illustrated embodiment, the registers 220 to 220*n* are data registers. Typically the registers 220 to 220*n* are organized into a register file.

The shared memory 230 is coupled to each one of the processing cores 210-210*n* and provides additional storage space therefor. The shared memory 230 is user-managed and provides higher latency when accessing compared to the registers 220 to 220*n*.

For the hierarchical hash table, the registers 220-220*n* and the shared memory 230 are not used as a cache to fasten key/value lookups but rather as a buffer to store elements during the life of a group of threads (e.g., a warp).

The connecting circuitry 240 couples the processing cores 210 to 210*n* to the shared memory 230. The connecting circuitry 244 and 246 couple the registers 220 and 220*n* to their respective processing cores 210 and 210*n*. One skilled in the art will understand that additional connecting circuitry would be used to connect corresponding registers and processing cores to each other. Each of the connecting circuitry 240, 244 and 246 are conventional connectors typically employed in graphic processing units.

Figure 3:
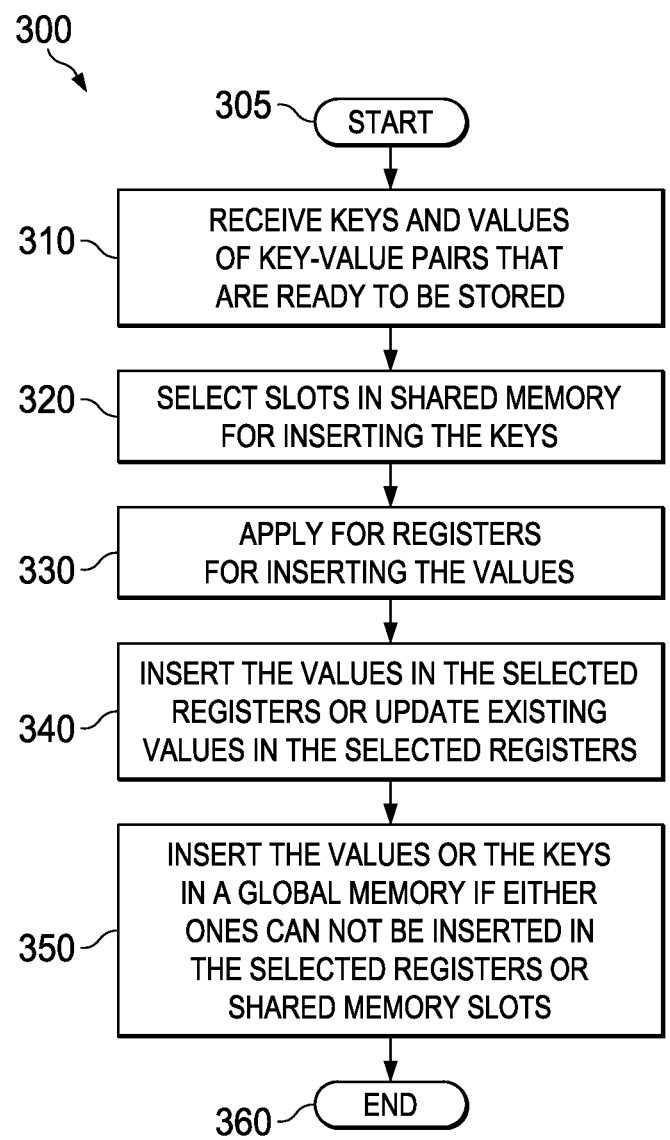
FIG. 3 illustrates a flow diagram of an embodiment of a method of establishing a hierarchical hash table for a graphics pipeline unit carried out according to the principles of the disclosure.

FIG. 3 illustrates a flow diagram of an embodiment of a method 300 of establishing a hierarchical hash table carried out according to the principles of the disclosure. The method 300 represents an algorithm that can be implemented as a series of operating instructions stored on a non-transitory computer readable medium that directs the operation of a processor when initiated. The method 300 can be carried out by or under the direction of a GPU controller such as GPU controller 118 of FIG. 1.

Threads executing on parallel processing cores, such as processing cores 110 and 110*n* of FIG. 2, have keys and values to insert. Threads insert their keys and values in parallel. For simplicity of explanation, the method 300 assumes that no two threads share the same key and is directed to inserting keys and values for a single thread executing on a processing core of a parallel processor. The generalization to cases where two threads share the same key can easily be done by someone skilled in the art. One skilled in the art will also understand that the method can be executed in parallel to insert keys and values of threads executing in parallel on parallel processing cores of a parallel processor.

The method 300 proceeds in two main steps. First, the method 300 attempts to insert keys in shared memory (e.g., shared memory 230 of FIG. 2) and values in registers (e.g., registers 220 to 220*n* of FIG. 2). If the insertion fails, i.e., some executing threads fail to insert their respective pair, the method attempts to insert the key or value in a global memory (e.g., global memory 121 of FIG. 1). Different hashing functions are used to insert keys and values in the hierarchical hash table. However, in contrast to creating conventional hash tables, the method 300 is more complex because some values are not stored in dynamically addressable memory. Instead, some values are stored in, or at least attempted to be stored in, registers associated with executing threads. This satisfies a need to achieve a good occupancy and deliver high performance since hash tables stored solely in a shared memory consume a significant portion of that memory. When keys are inserted in shared memory and values in registers, less shared memory is used and a higher occupancy is achieved. The method 300 begins in a step 305.

In a step 310, keys and values of key-value pairs of threads executing on a parallel processor are ready to be stored. The key-value pairs are produced by the executing threads.

In a step 320, the threads select a slot in shared memory for inserting their keys. If several threads compete for the same slot, no more than one thread can be satisfied.

In a step 330, threads which have found slots in shared memory for their keys, apply for registers to store their values. A thread may apply for a register which does not belong to the core which is executing that thread.

In a step 340, the values are inserted in the selected registers or the existing values in those registers are updated. One skilled in the art may decide to apply a different policy with respect to inserting or updating the values in registers.

In a step 350, a global memory buffer associated with the parallel processor is used to store the keys and the values that cannot be stored in the shared memory and register. In some applications, global memory is not needed to store keys and values. The method 300 ends in a step 360.

In one embodiment, the method 300 can employ different hashing functions to insert keys and values in the hash table. The hash functions can be conventional hash functions wherein the parameters are varied for each function. The following represents an algorithm that can be employed to insert keys and values in a hash table.

foreach hash_function:

```
if all threads have inserted their value
    return
insert_in_smem_regs(key, val, hash_function)
foreach hash_function:
    if all threads have inserted their value
        return
    insert_in_gmem(key, val, hash_function)
```

In one embodiment, the function to insert keys and values in shared memory and registers can be implemented by the following algorithm.

insert_in_smem_regs(key, val, hash_function):

```
hash_idx = hash_function(key) % SMEM_SIZE;
if( m_smem_keys[hash_idx] == key )
    update_value_in_register(m_regs_vals, hash_idx, val
);
if( m_smem_keys[hash_idx] is empty ) // empty means a
sentinel value.
    m_smem_keys[hash_idx] = key;
    if( m_smem_keys[hash_idx] == key )
    {
    // The key has been accepted (after possibly some bank
conflicts).
        update_value_in_register(m_regs_vals, hash_idx, val
);
```

The above code fragment "hash_idx= . . . " takes the key, applies the hash function and returns an integer memory location. If the hash function generates an integer memory location that is greater than the number of buffer slots, then a modulus of the integer memory location can be taken to fit within the buffer slots. In step "if(m_smem . . . )", it is determined if the slot in shared memory has a key already stored. If so, the value in the corresponding register has to be updated. If the key is not in the shared memory and the slot is empty, then an attempt to write the key in that slot in shared memory is made. In one embodiment, the emptiness of a slot can be represented with a sentinel value, for e.g. −1 if no valid key is negative.

When a slot is empty, several threads may attempt to write their keys at that slot. Only one wins. Each thread determines if it is the winner. If so, then the corresponding register is updated with the value or the value is inserted in the register. If a loser, then the same operation is rerun with a different hash function, wherein a limited number of hash functions exist.

After a number of hash functions have been used, all of the registers are loaded with the values. A hardware command can be used to indicate that the threads are filled. In one embodiment, the hardware command VOTE can be used to determine if the registers are full. In VOTE, each of the threads indicates via a binary vote if their registers are full. Since there is a limited amount of memory provided by the registers and the shared memory, global memory is used to store remaining values and keys.

To be able to address registers as if they were shared memory, the method 300 employs a protocol which consists of two steps. That protocol allocates a buffer in the shared memory where candidate threads can be registered. In a first step, writer threads which have a value to store will write their identifier in the shared registration buffer. In a second step, threads owning the registers that are to be modified will collect values from the writers and update the registers.

In that protocol, the registration buffer contains a slot per register to be addressed. In one embodiment, a slot will typically use less memory space than the value stored in register. The protocol determines if a slot in the shared buffer contains the identifier of a thread. If so, the thread owning the register associated with the slot can collect the value from that other thread and store that value in its corresponding register.

In one embodiment, the following code can be used to implement the first step of the protocol. Writer threads, which have a value to insert, can register for insertion.

Writer threads do:
compute the location loc of the target register
store my thread ID at position loc in the shared buffer.
When all writer threads are registered, threads turn themselves into storage threads to perform the second step.

If a slot of the shared memory contains a valid thread identifier (the identifier of a writer thread), the storage thread collects the value from the writer and updates its storage. In one embodiment, the following code can be used to collect values and update the registers.

Storage threads do:
my_slots=collect my slots from the shared registration buffer
foreach register r:
get the candidate ID for my_slots[r]
shuffle the values among threads using the candidate's ID
update the value in r with the candidate's value.
In that code fragment, "my_slots[r]" contains the identifier of the candidate thread which wants to write in register r, if any. If there is no candidate, a sentinel identifier can be used, e.g., warpSize.

A hardware instruction, such as SHFL, can be used to distribute the candidate values to different threads. SHFL is a hardware command that allows threads to read registers from other threads.

The above apparatuses and schemes provide a method of operating a graphics processing unit that includes receiving an operating instruction, partitioning the operating instruction into multiple threads for processing by parallel processors, wherein each of the multiple threads includes a key-value pair and employing registers and shared memory of the parallel processors to establish hash tables for the multiple operating threads.

A portion of the above-described apparatuses, systems or methods may be embodied in or performed by various processors, including parallel processors, or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions of the apparatuses described herein.

Portions of disclosed embodiments may relate to computer storage products with a non-transitory computer-readable medium that have program code thereon for performing various computer-implemented operations that embody a part of an apparatus, system or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Those skilled in the art to which this application relates will appreciate that other and further additions, deletions, substitutions and modifications may be made to the described embodiments.

What is claimed is:

1. A graphics processing unit having an implementation of a hierarchical hash table thereon, said graphics processing unit comprising:
   a plurality of parallel processors, wherein each of said plurality of parallel processors includes parallel processing cores, a shared memory coupled to each of said parallel processing cores, and registers, wherein each one of said registers is uniquely associated with one of said parallel processing cores; and
   a controller configured to employ at least one of said registers to establish a hierarchical hash table for a key-value pair of a thread processing on one of said parallel processing cores, wherein said hierarchical hash table stores said key-value pair.

2. The graphics processing unit as recited in claim 1 wherein said controller is configured to store a value of said key-value pair in said at least one of said registers.

3. The graphics processing unit as recited in claim 1 wherein said controller is further configured to store a key of said key-value pair in said shared memory.

4. The graphics processing unit as recited in claim 1 further comprising a global memory coupled to each of said plurality of parallel processors, wherein said controller is configured to store remaining keys or values of said hierarchical hash table in said global memory.

5. The graphics processing unit as recited in claim 1 wherein said controller is configured to store a value of said key-value pair on one of said registers associated with another one of said parallel processing cores.

6. The graphics processing unit as recited in claim 1 wherein said controller is configured to insert keys and values of key-values pairs of threads processing on said parallel processing cores in said hierarchical hash table in parallel.

7. The graphics processing unit as recited in claim 1 wherein said controller is configured to emulate dynamic addressing of said registers to insert values of key-value pairs.

8. A method of establishing a hierarchical hash table in a graphics processing unit having parallel processors, comprising:
   receiving a key and a value of a key-value pair of a thread processing on a parallel processor;
   employing said hierarchical hash table to store said key-value pair; and
   selecting a register of a parallel processing core of said parallel processor to insert said value.

9. The method as recited in claim 8 further comprising selecting a shared memory of said parallel processor to insert said key.

10. The method as recited in claim 8 wherein said thread is not executing on said parallel processing core.

11. The method as recited in claim 8 further comprising inserting said value in said register and inserting said key in said shared memory.

12. The method as recited in claim 8 further comprising determining if said value and said key can be stored in said register and said shared memory.

13. The method as recited in claim 12 further comprising employing a global memory of said graphics processing unit to store said value or said key that cannot be stored in said register or said shared memory.

14. The method as recited in claim 8 further comprising employing said thread to update an existing value in said register to said value.

15. A graphics processing unit (GPU) computing system, comprising:
   a central processing unit including a processor and associated with a memory; and
   a graphics processing unit having a hierarchical hash table, said graphics processing unit including:
      a plurality of parallel processors, wherein each of said plurality of parallel processors includes parallel processing cores, a shared memory coupled to each of said parallel processing cores, and registers, wherein each one of said registers is uniquely associated with one of said parallel processing cores, wherein said hierarchical hash table is used to store key-value pairs associated with threads executing on said parallel processing cores; and
      a controller configured to employ said registers to store values of said key-value pairs.

16. The GPU computing system as recited in claim 15 wherein said controller is further configured to employ said shared memory to store keys of said key-value pairs.

17. The GPU computing system as recited in claim 15 wherein said controller is configured to establish a hierarchical hash table employing said registers and said shared memory and that associates said keys to said values.

18. The GPU computing system as recited in claim 15 wherein said graphics processing unit further includes a global memory and said controller is configured to employ said global memory to store remaining values and keys of said hierarchical hash table.

19. The GPU computing system as recited in claim 15 further comprising a function library, wherein said threads are instructions from said function library.

20. The GPU computing system as recited in claim 15 wherein said controller is further configured to employ one of said values to update an existing value already stored in at least one of said registers.

* * * * *